US008086718B2

(12) United States Patent
Li et al.

(10) Patent No.: US 8,086,718 B2
(45) Date of Patent: *Dec. 27, 2011

(54) AUTOMATED PROCESS AND APPARATUS FOR PROVIDING INTEGRATED MANAGEMENT AND CONTROL OF COMPUTER NETWORKS

(75) Inventors: Hong Li, El Dorado Hills, CA (US); John Vicente, Roseville, CA (US); Richard Robak, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,635

(22) Filed: Apr. 13, 2010

(65) Prior Publication Data
US 2010/0293262 A1 Nov. 18, 2010

Related U.S. Application Data

(63) Continuation of application No. 10/882,899, filed on Jun. 30, 2004, now Pat. No. 7,698,403.

(51) Int. Cl.
*G06F 15/173* (2006.01)
(52) U.S. Cl. .................................. 709/223; 709/246
(58) Field of Classification Search .................. 709/203, 709/220, 221, 223, 224, 225, 226, 229, 246; 713/201, 200; 370/468
See application file for complete search history.

(56) References Cited

U.S. PATENT DOCUMENTS

| 7,370,098 | B2 | 5/2008 | Doyle et al. | |
|---|---|---|---|---|
| 7,526,508 | B2 | 4/2009 | Tan et al. | |
| 2002/0097747 | A1* | 7/2002 | Kirkby et al. | 370/468 |
| 2002/0143939 | A1* | 10/2002 | Riddle et al. | 709/224 |
| 2004/0098610 | A1* | 5/2004 | Hrastar | 713/200 |
| 2004/0103315 | A1* | 5/2004 | Cooper et al. | 713/201 |
| 2004/0193912 | A1* | 9/2004 | Li et al. | 713/200 |
| 2005/0010820 | A1* | 1/2005 | Jacobson | 713/201 |

OTHER PUBLICATIONS

Notice of Allowance for U.S. Appl. No. 10/882,899 mailed Dec. 1, 2009, 6 pp.
Non-Final Office Action for U.S. Appl. No. 10/882,899 mailed Apr. 1, 2009, 6 pp.
Boutilier, Craig, et al., "Cooperative Negotiation in Autonomic Systems using Incremental Utility Elicitation", *UAI*, Department of Computer Science, University of Toronto, Toronto, ON, M5S 3H5, Canada—IBM T.J. Watson Research Center 19 Skyline Dr., Hawthorne, NY 10532, USA, (2003), Whole Document.
Hinnelund, Patrick, "Autonomic Computing—a method for automated systems management", *Systems management using distributed local control*, Master's Thesis in Computer Science (20 credits) at the School of Computer Science and Engineering, Royal Institute of Technology, Mar. 2004. Whole Document.
Kephart, Jeffrey O., et al., "The Vision of Automatic Computing", *IEEE Computer Society*, (Jan. 2003), 41-50.

(Continued)

*Primary Examiner* — Le Luu
(74) *Attorney, Agent, or Firm* — Blakely, Sokoloff, Taylor & Zafman LLP

(57) ABSTRACT

A method and apparatus for an automated system management process are described. According to an embodiment of the invention, a method comprises receiving data regarding operation of a network; automatically generating network policies based at least in part on the data regarding operation of the network using automation intelligence; applying the network policies to modify operations of the network; and receiving data regarding the operation of the network after the modification of the operations of the network.

11 Claims, 7 Drawing Sheets

OTHER PUBLICATIONS

Pacifici, Giovanni, et al., "Performance Management for Cluster Based Web Services", *IBM TJ Watson Research Center*, fgiovanni,mspreitz,tantawi,ayoussefg@us.ibm.com, (May 13, 2003), 1-17.

* cited by examiner

AUTOMATED PROCESS AND APPARATUS FOR PROVIDING INTEGRATED MANAGEMENT AND CONTROL OF COMPUTER NETWORKS

RELATED APPLICATION

This application is a continuation of and claims priority to U.S. patent application Ser. No. 10/882,899, filed Jun. 30, 2004, now U.S. Pat. No. 7,698,403, issued Apr. 13, 2010, entitled "An Automated Management System Generating Network Policies Based On Correlated Knowledge To Modify Operation Of a Computer Network", the entire contents of which are hereby incorporated by reference.

FIELD

An embodiment of the invention relates to system management in general, and more specifically to an automated system management process.

BACKGROUND

In enterprises and systems, such as computer networks, there is a need to provide for management of operations, in which the operations of the enterprise are detected and system changes are made to react to operational issues. In a conventional enterprise management system, the management process is a bottom-up approach in a disjointed system, where the management "plane", in which data is obtained for analysis, is disconnected from the control "plane", in which policies are developed and implemented.

Conventional systems may include different but related management and control processes. For example, in a FCAPS model of network management there are five parallel management components, generally called the fault-management component (F), the configuration management component (C), the accounting management component (A), the performance management component (P), and the security management component (S). However, conventional systems do not integrate these functions, but rather provide separate processes. For example, a network performance management may be provided by a system completely separated and different from the system that is managing network security, although network performance and security are two tightly-coupled functions that should be managed in close correlation.

Further, modern computer networks are increasingly diverse. A computer network often includes devices and systems that operate using various protocols and that are produced by various different manufacturers. The combination of diverse network elements and disconnected processes can create an inefficient management system that is not capable of quickly and effectively reacting to changes in the network.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
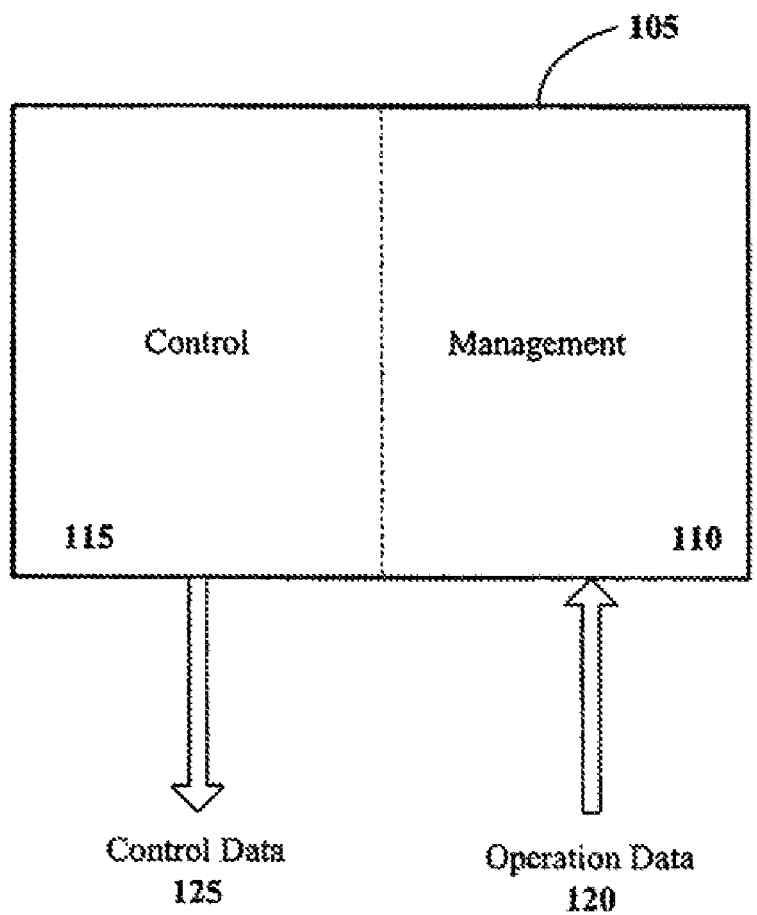
FIG. 1 illustrates an embodiment of integration of enterprise management and control.

A method and apparatus are described for an automated management process.

According to an embodiment of the invention, management and control of enterprises or systems are integrated together. Under an embodiment of the invention, a management of a system is automated, responding automatically to system changes. Under one embodiment, a managed system may be heterogeneous, including a computer network. A computer network may include varying elements, with each element performing different functions. Further, such elements may utilize various different protocols and may be produced by various different manufacturers.

Under an embodiment of the invention, a management feedback loop for an enterprise is formed. Under an embodiment, operation data for an enterprise is used to generate management data for the enterprise. The management data is used to modify the operation of the enterprise, resulting in new operation data to be fed back for the generation of additional management data.

According to an embodiment of the invention, automated intelligence is utilized to automatically generate control data based on correlated operational information. Under one embodiment, a computer network may include multiple different protocols, with hardware and software being derived from various vendors. In an embodiment, the operation data may include, but is not limited to, configurations, events, and metrics derived from network operation. Under an embodiment, the operation data, which may be derived from multiple different protocols, is converted or transformed into generalized information. In one embodiment, the operation data from a network is correlated and integrated. In one embodiment, operation data is correlated to form data such as configuration data, event data, and metric data. The correlated data then is integrated to generate correlated knowledge, which may be used in management analysis without reference to the original protocols involved. Under an embodiment, the correlated knowledge is used to generate policies for the changes in network. Under an embodiment of the invention, generated policies are subjected to a provisioning process to generate rule semantics and reconfiguration semantics. The rule semantics and reconfiguration semantics are subjected to an enforcement process to generate rules and reconfigurations for the computer network, which may include various different protocols.

Under an embodiment of the invention, management and control planes, and thus management and control functions, are integrated into an automated system utilizing automated, operational intelligence. In an embodiment, a management system utilizes automated information sharing, data integration and correlation, and dynamic policy provisioning and enforcement to provide automatic management of an enterprise or system. An embodiment substitutes conventional unidirectional, bottom-up management process with data flows in control and management planes that form a closed feedback loop. The closed feedback loop allows the managed enterprise or system to be automatically re-configurable with dynamic rules, thereby forming a system that is self-regulating and adaptive to environment changes.

Under an embodiment of the invention, an integrated system generalizes network management, thereby removing proprietary instrumentation semantics in analysis and generation of policies. In one embodiment, a network management system for a heterogeneous network obtains operational data for multiple protocols, removes the protocol differences to produce generalized information, analyzes the generalized information, transforms the generalized information into correlated knowledge, produces policies automatically based at least in part on the correlated knowledge, and transforms the policies into data that is specific for various protocols, rules, and configurations.

Under an embodiment, a closed management loop utilizes bi-directional data flows to enable management and control functions and provide a managed system that is re-configurable with dynamic rules. Embodiments of the invention are not limited to computer network management. An embodiment may be applied in the management of any system or enterprise, and may specifically be used in operations in which integration, interoperability, and automation may be applied in a heterogeneous system environment.

FIG. 1 illustrates an embodiment of integration of enterprise management and control. In this illustration, a management system 105 integrates enterprise management operations and enterprise control operations. Under an embodiment of the invention, the management system 105 includes a management plane 110 and a control plane 115. Under an embodiment, operation data 120 for an enterprise is provided to the management system 105, and the system generates control data 125 for the enterprise based at least in part on the operation data 120. Under an embodiment of the invention, the management system 105 utilizes intelligent processing to provide an automated response to operation data 120, with the response utilizing learning or trained knowledge of the operational environment. Under one embodiment of the invention, the enterprise comprises a computer network.

Figure 2:
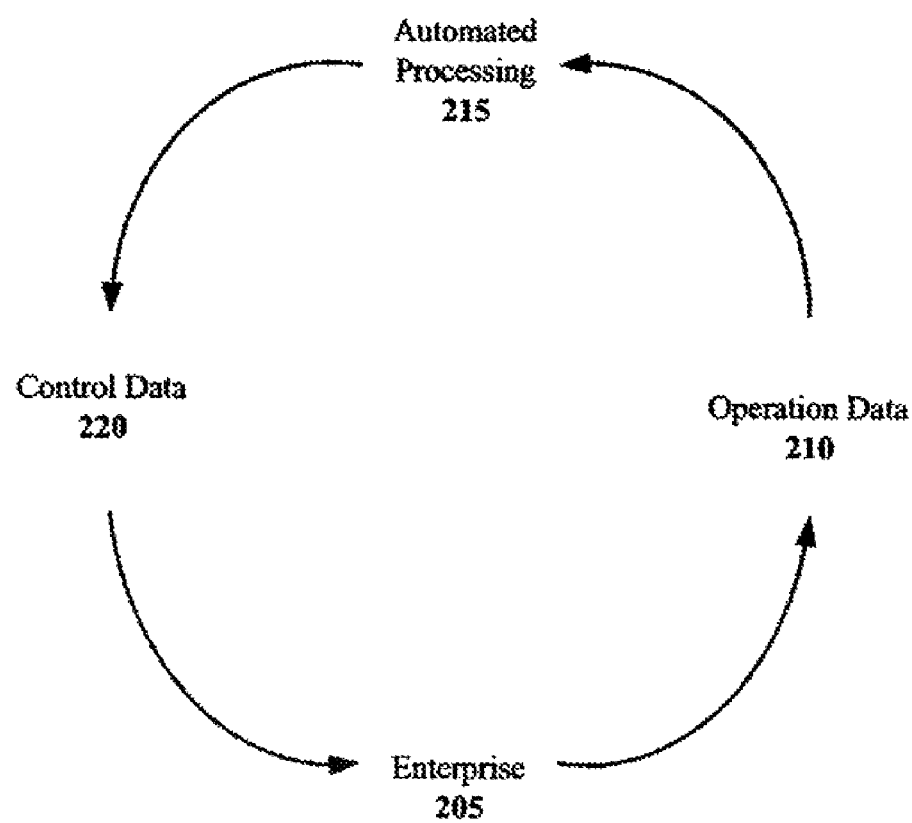
FIG. 2 is an illustration of a closed feedback management loop for an enterprise or system.

FIG. 2 is an illustration of a closed feedback management loop for an enterprise or system. In this illustration, an enterprise, such as a computer network, is managed utilizing a feedback loop. The enterprise 205 generates or provides operation data 210 that reflects the state of operations of the enterprise. The operation data is then provided for automated processing 215, which includes evaluating the operations of the enterprise and determining what changes are needed in the enterprise based at least in part on the operation data 210. The automated processing 215 generates control data 220 that may be used to direct modifications in the enterprise. Under an embodiment of the invention, the automated processing includes automation intelligence that can learn from experiences in enterprise operations and then use the experiences in analysis of operation data and in generation of control data 220. The control data 220 is applied to the enterprise 205. The enterprise 205 then continues operations as modified by the control data 220, which then results in new operation data 210 and continuation of the closed feedback loop.

Figure 3:
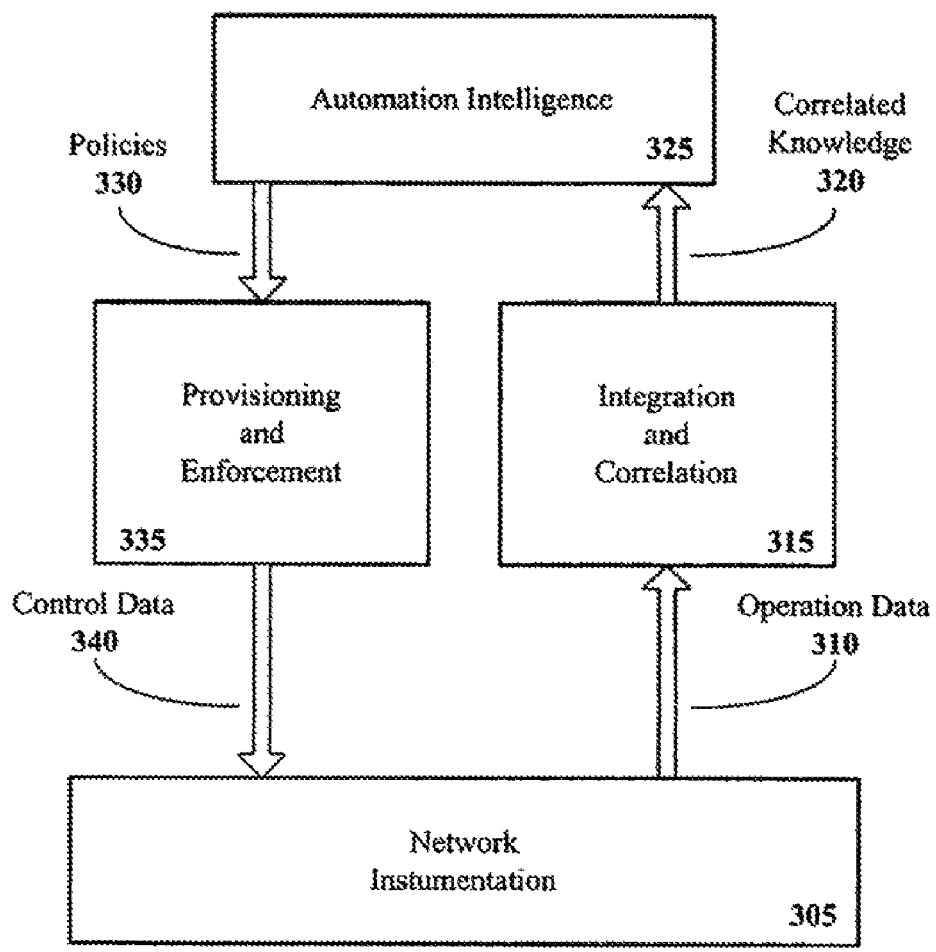
FIG. 3 illustrates an embodiment of automatic operation of network management and control.

FIG. 3 illustrates an embodiment of an automatic operation of network management and control. In this illustration, network instrumentation 305 provides operation data 310, which may include multiple different protocols. The operation data 310 is subject to correlation and integration operations 315. The result of integration and correlation is correlated knowledge 320, which is provided to automation intelligence 325. Under an embodiment of the invention, the correlated knowledge 320 is presented in a form that is generalized and may be unrelated to the original protocol of the data. The automation intelligence 325 then generates policies 330 for the network. Under an embodiment of the invention, the automation intelligence 325 learns and adapts from experience in network management and control. In an embodiment, the automation intelligence 325 uses knowledge and experience that is gained from such experience for the generation of the policies 330.

Under an embodiment of the invention, the policies are subjected to provisioning and enforcement operations 335 to produce control data 340 for the network instrumentation 305. Under an embodiment of the invention, a feedback loop is thus provided for network management, in which operation data is utilized to create new network policies, which are then applied to the network. The policies may cause changes in the network environment, which results in new operation data for evaluation and thus continues the feedback loop process.

Figure 4:
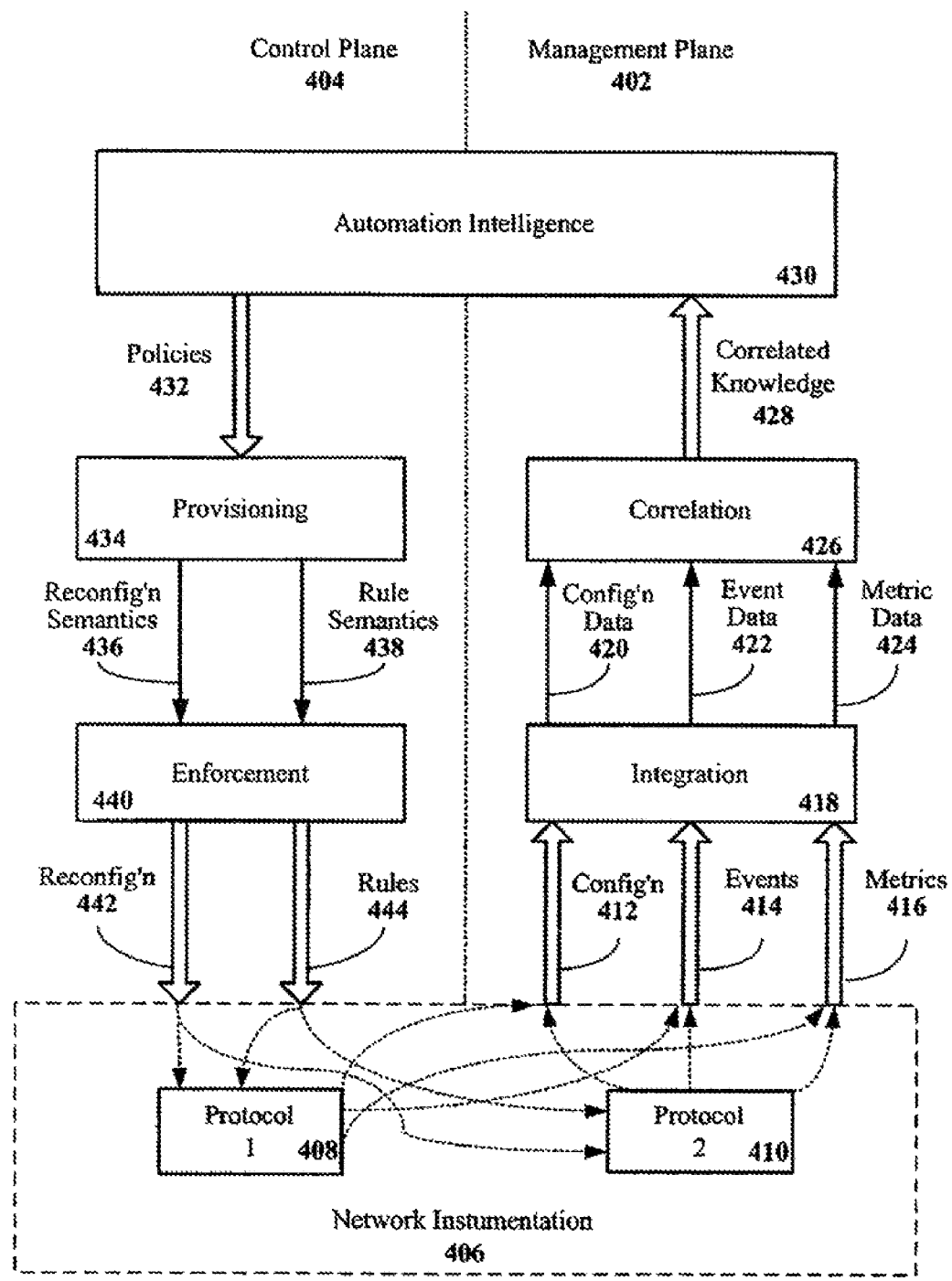
FIG. 4 illustrates an embodiment of a system providing integrated network management and control for multiple protocols.

FIG. 4 illustrates an embodiment of a system providing integrated network management and control for multiple protocols. In the illustrated system, there is a management plane 402 and a control plane 404 that are combined to form an integrated network management process. In this illustration, a network includes instrumentation 406, which includes the devices, systems, and other hardware and software for the network. In an embodiment of the invention, the instrumentation 406 may include items produced by various manufactures and utilizing various different protocols. In one example, the instrumentation utilizes multiple protocols, including a first protocol, protocol 1 408, and a second protocol, protocol 2 410. Data regarding the operation of the network is obtained. The data includes configurations 412, events 414, and metrics 416, which may be received from each of the various protocols. The received data is then integrated 418, thereby forming integrated configuration data 420, event data 422, and metric data 424. By integrating such data, data from one protocol may be combined with data from other protocols. The integrated data is then subjected to correlation 426 to generate correlated knowledge 428 regarding the current operation of the network.

The correlated knowledge 428 is then provided to automation intelligence 430. The automation intelligence 430 automatically analyzes the correlated knowledge 428 to determine what network modifications are needed based at least in part on the correlated knowledge 428. The automation intelligence 430 then will generate policies 432 for the network to implement any desired modifications in operation. Under an embodiment of the invention, the automation intelligence 430 is capable of learning from or being trained by prior experience in network management and control. The automation intelligence 430 then can use knowledge and learned behavior in the process of generating the policies 432. The policies 432 are subjected to a provisioning process 434, which will generate reconfiguration semantics 436 to address any needed changes in configuration and rule semantics 438 to address any needed changes in operation. The reconfiguration semantics 436 and rule semantics 438 are then subjected to an enforcement process 440 to generate reconfiguration data 442 and rule data 444 for any relevant protocol of the network instrumentation 406, these being illustrated as protocol 1 408 and protocol 2 410.

Figure 5:
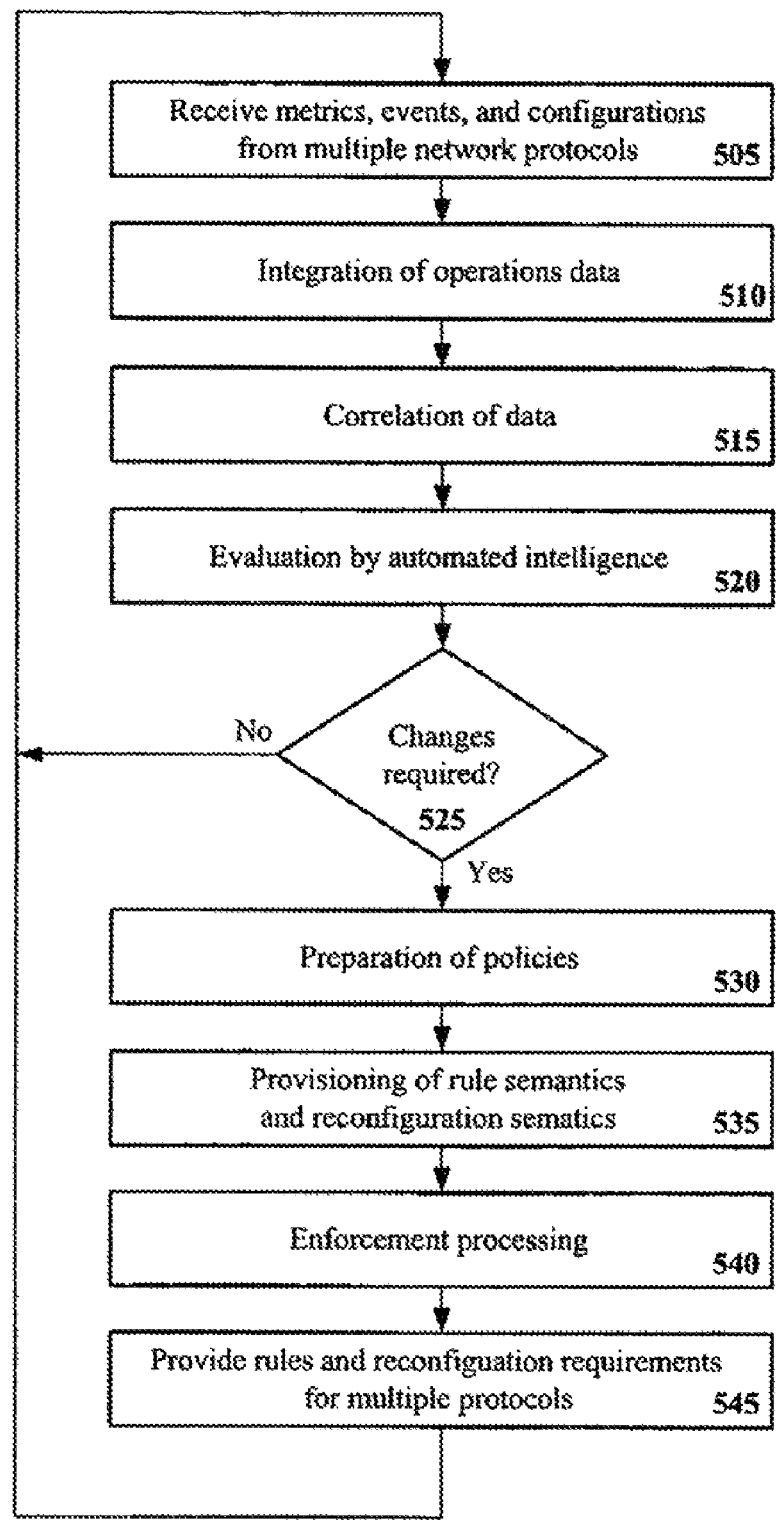
FIG. 5 is a flow chart to illustrate an embodiment of a process for providing management and control of a computer network.

FIG. 5 is a flow chart to illustrate an embodiment of a process for providing management and control of a computer network. In this illustration, metrics, events, and configuration data are received 505, with the data being derived from higher-level of abstraction (for example, translation of a business policy) or from multiple protocols, network configurations, and device rules. The data is then integrated 510 and correlated 515, with the resulting subject being correlated knowledge that is independent of the various protocols and low-level rules from which the original data derived. The correlated knowledge is evaluated by automated intelligence 520, which determines whether there are any changes in network operations needed 525. If not, then the process continues with the collection of operation data 505. If changes are needed, then revised policies are prepared 530, the policies being independent of the various protocols that are utilized in the network instrumentation. The policies are then subjected to provisioning to produce rule semantics and reconfiguration semantics 535. Such semantics are then provided to enforcement processing 540 to produce the rules and configuration requirements needed for the multiple protocols 545. The process then returns to receiving metrics, events, and configurations from the network 505.

Figure 6:
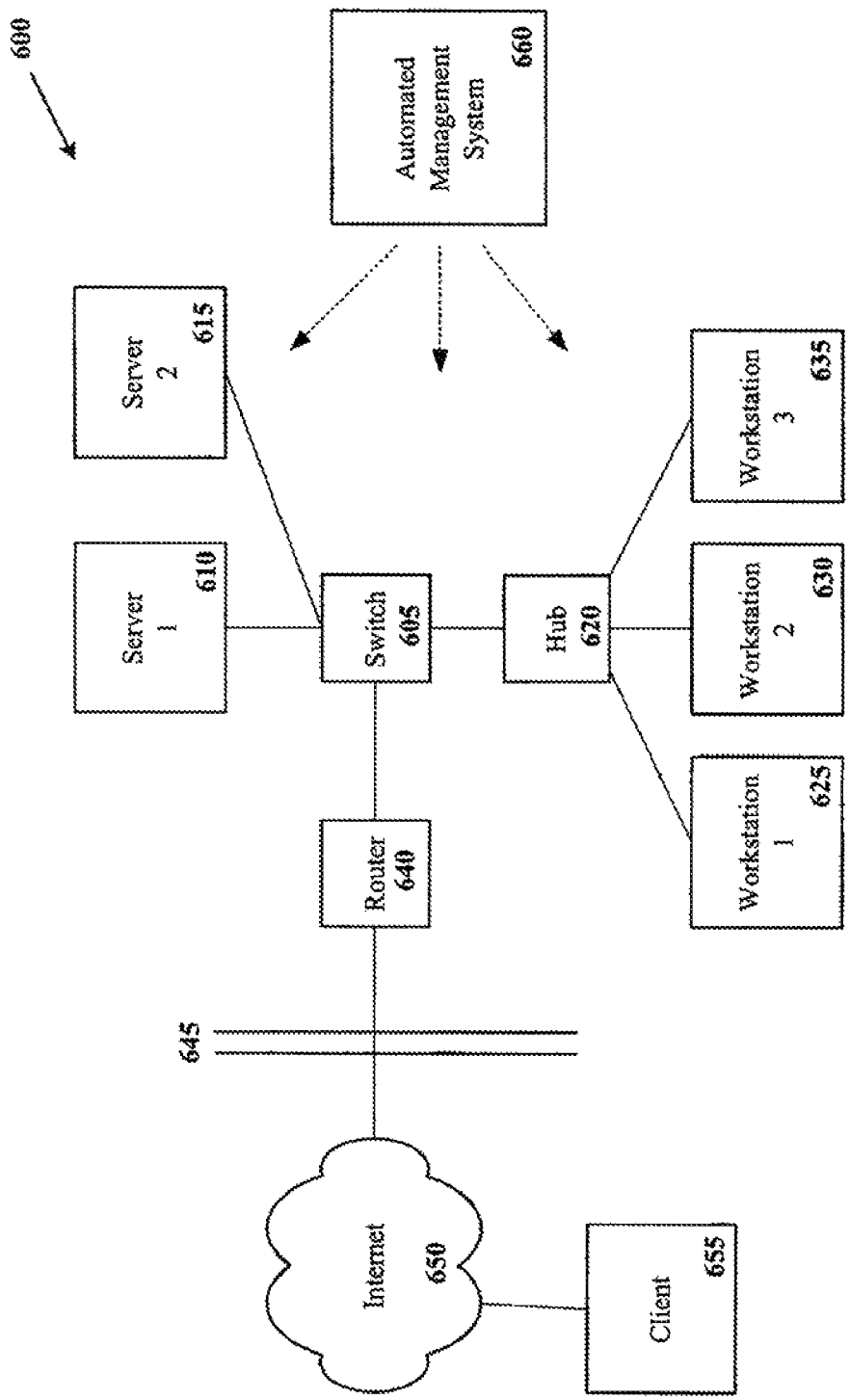
FIG. 6 illustrates an embodiment of a computer network.

FIG. 6 illustrates an embodiment of a computer network. Networks may be comprised of widely varying components, with FIG. 6 providing one simplified example. Networks may be classified according to their geographical area, such as a local area network (LAN), metropolitan area network (MAN), or wide area network (WAN). In its simplest form, a network comprises two or more computers and associated devices that are linked together with some version of communications equipment. Network connections may be established using varying technologies, including twisted-pair wiring, coaxial cable, fiber-optic cable, and radio signals, and may utilize various connectors or devices such as NICs (network interface cards).

In this illustration, a network 600 may include one or more switches 605, a switch being a device to select a path or circuit for data. In this illustration, the switch 605 may be connected to one or more servers, shown as server 1 610 and server 2 615. Certain network topologies do not include a designated server. In FIG. 6, a hub 620 is connected to the switch 605, with a hub being a common connection point for devices in a network. In this illustration, the hub 620 is connected to multiple workstations, shown as workstation 1 625, workstation 2 630, and workstation 3 635. The network 600 may also include one or more routers 640, which are devices to forward packets of data, such as in a connection between two networks. In this illustration, the router 640 connects the network 600 with the Internet 650, although the connection could be to any other network. The network 600 may include various security devices, including a firewall 645 to protect the network from intrusion. In general, a firewall is hardware, software, and/or procedures intended to prevent unauthorized access to or operation on a network. In FIG. 6, a client system 655 may access the network 600 through the Internet 650.

Under an embodiment of the invention, the network 600 is managed utilizing an automated management system 660, in which management and control functions work together and form a management feedback loop. Under an embodiment of the invention, the components of the network 600 may operate utilizing varying protocols. Under an embodiment of the invention, data regarding the operation of the network 600 is integrated and correlated to generate correlated knowledge for use by automated intelligence in the automated management system 660 for the generation of policies for the network 600.

Figure 7:
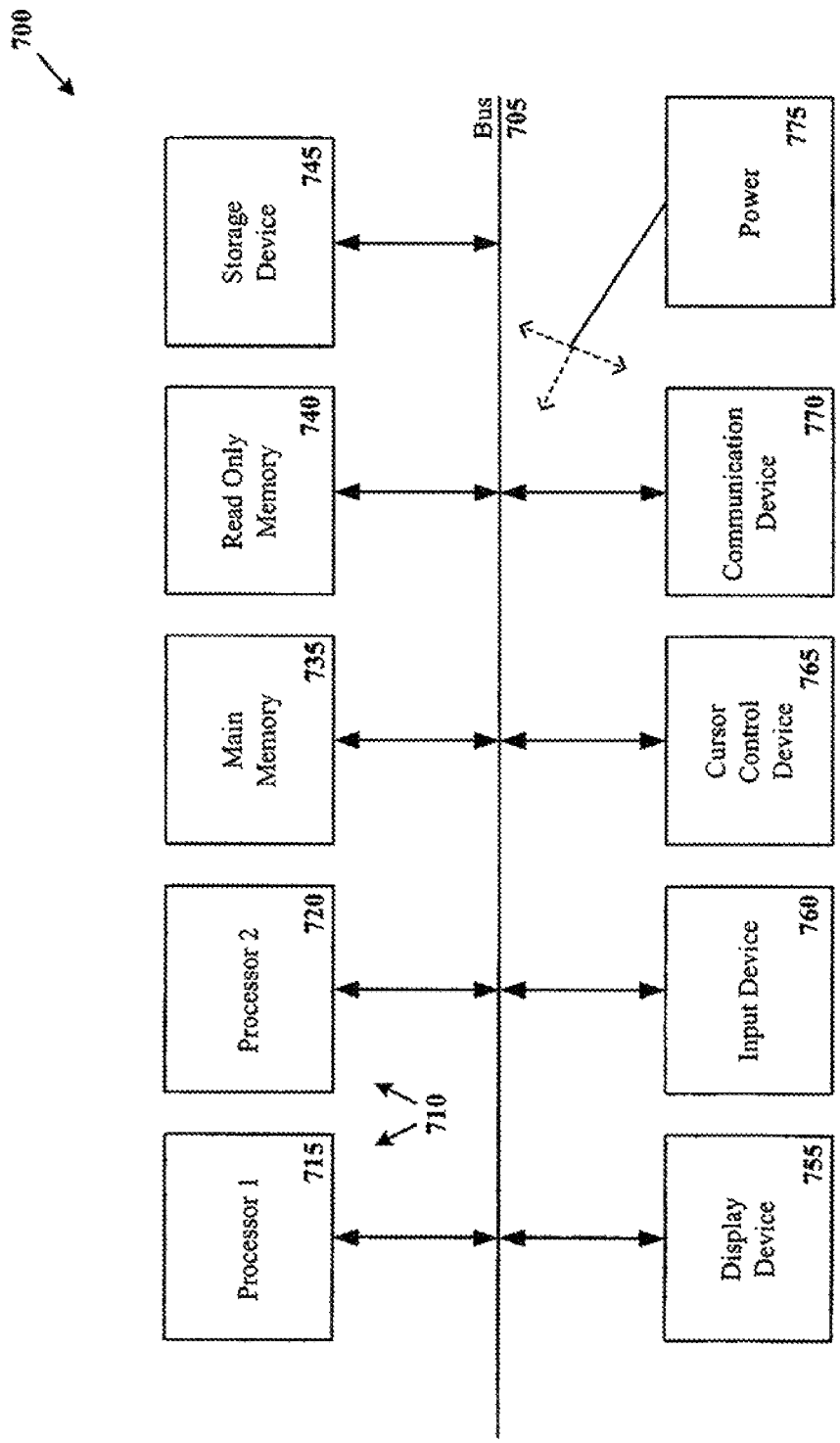
FIG. 7 illustrates an embodiment of a computer in a network.

FIG. 7 illustrates an embodiment of a computer in a network. The computer may, for example, represent a client system or a server system. Under an embodiment of the invention, a computer 700 comprises a bus 705 or other communication means for communicating information, and a processing means such as one or more processors 710 (shown as a first processor 715 and a second processor 720) coupled with the bus 705 for processing information. The one or more processors may comprise one or more physical processors and one or more logical processors.

The computer 700 further comprises a random access memory (RAM) or other dynamic storage device as a main memory 735 for storing information and instructions to be executed by the processors 710. Main memory 735 also may be used for storing temporary variables or other intermediate information during execution of instructions by the processors 710. The computer 700 also may comprise a read only memory (ROM) 740 and/or other static storage device for storing static information and instructions for the processor 710.

A data storage device 745 may also be coupled to the bus 705 of the computer 700 for storing information and instructions. The data storage device 745 may include a magnetic disk or optical disc and its corresponding drive, flash memory or other nonvolatile memory, or other memory device. Such elements may be combined together or may be separate components, and utilize parts of other elements of the computer 700.

The computer 700 may also be coupled via the bus 705 to a display device 755, such as a cathode ray tube (CRT) display, a liquid crystal display (LCD), or other display technology, for displaying information to an end user. In some environments, the display device may be a touch-screen that is also utilized as at least a part of an input device. In some environments, display device 755 may be or may include an auditory device, such as a speaker for providing auditory information. An input device 760 may be coupled to the bus 705 for communicating information and/or command selections to the processor 710. In various implementations, input device 760 may be a keyboard, a keypad, a touch-screen and stylus, a voice-activated system, or other input device, or combinations of such devices. Another type of user input device that may be included is a cursor control device 765, such as a mouse, a trackball, or cursor direction keys for communicating direction information and command selections to the one or more processors 710 and for controlling cursor movement on the display device 755.

A communication device 770 may also be coupled to the bus 705. Depending upon the particular implementation, the communication device 770 may include a transceiver, a wireless modem, a network interface card, or other interface device. Under an embodiment of the invention, the computer 700 may be linked to a network or to other devices using the communication device 770, which may include links to the Internet, a local area network, or another environment. The computer 700 may also comprise a power device or system 775, which may comprise a power supply, a battery, a solar cell, a fuel cell, or other system or device for providing or generating power. The power provided by the power device or system 775 may be distributed as required to elements of the computer 700.

Under an embodiment of the invention, the computer 700 is a part of a network, the network being managed utilizing an integrated management system. In the embodiment, management and control planes are combined and operated as a closed feedback loop. Under an embodiment of the invention data regarding the operation of the computer 700 may be collected, with such data including one or more of configuration, events, and metrics data. Under an embodiment of the invention, the data regarding the operation of the computer 700 may be integrated and correlated with data regarding the operation of other elements of the network to generate correlated knowledge, the correlated knowledge being provided to an automated intelligence for the generation of policies for the network. Under an embodiment of the invention, the policies are subject to provisioning and enforcement processes to produce rules and reconfiguration data for the computer 700.

In the description provided above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for integrated management and control of computer networks comprising:

receiving data regarding operation of a computer network, elements of the computer network comprising two or more computers and one or more switches or hubs, the elements of the computer network utilizing a plurality of protocols;

automatically generating network policies at an automated management system based at least in part on the data regarding operation of the computer network, wherein the network policies are independent of the plurality of protocols;

subjecting the generated network policies to a provisioning process to generate rule semantics and reconfiguration semantics;

subjecting the rule semantics and reconfiguration semantics to enforcement processing to generate rules and reconfigurations for the computer network in the form of each of the plurality of protocols to modify operations to apply the network policies and modify operations of the computer network; and receiving data regarding the operation of the computer network after the modification of the operations of the computer network.

2. The method of claim 1, further comprising learning from experience with the operation of the computer network, wherein the generation of network policies is based at least in part on the learning from experience with the operation of the computer network.

3. The method of claim 1, wherein the reception of data, the generation of the network policies, and the application of the network policies are parts of a closed feedback loop.

4. The method of claim 1, wherein the data regarding operation of the computer network comprises one or more of metrics, event data, and configuration data.

5. The method of claim 1, wherein the data regarding operation of the computer network is received in the form of a plurality of protocols.

6. The method of claim 5, further comprising transforming the data regarding the operation of the computer network into generalized data that removes protocol differences.

7. An integrated management and control system for a computer network comprising:

a management plane, the management plane to obtain operation data from a plurality of network elements, the network elements including two or more computers and one or more switches or hubs, the network elements utilizing a plurality of protocols;

an automated processor with automation intelligence to generate network policies for the plurality of network elements based at least in part on the operation data, wherein the network policies are independent of the plurality of protocols; and a control plane, the control plane being operable to:
subject the network policies to a provisioning process to generate rule semantics and reconfiguration semantics, and
subject the rule semantics and reconfiguration semantics to enforcement processing to generate rules and reconfigurations for the computer network in the form of each of the plurality of protocols to modify operations of the computer network.

8. The management system of claim 7, wherein the operation data is derived from the plurality of different protocols.

9. The management system of claim 7, wherein the management system forms a closed feedback loop.

10. The management system of claim 7, wherein the management plane is to transform the operation data into generalized data and transform the generalized data into correlated knowledge.

11. The management system of claim 7, wherein the automation intelligence is to learn from past experience regarding the computer network, wherein the generation of policies for the plurality of network elements utilizes the learning from the past experience regarding the computer network.

* * * * *